(12) United States Patent
Sobel et al.

(10) Patent No.: US 8,281,410 B1
(45) Date of Patent: Oct. 2, 2012

(54) METHODS AND SYSTEMS FOR PROVIDING RESOURCE-ACCESS INFORMATION

(75) Inventors: William E. Sobel, Jamul, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 744 days.

(21) Appl. No.: 12/059,700

(22) Filed: Mar. 31, 2008

(51) Int. Cl.
G06F 7/04 (2006.01)
G06F 17/30 (2006.01)
H04N 7/16 (2011.01)
(52) U.S. Cl. ........... 726/27; 726/1; 726/2; 726/3; 726/4; 726/14; 726/16; 726/28; 726/29; 726/30
(58) Field of Classification Search ............ 726/16
See application file for complete search history.

(56) References Cited

U.S. PATENT DOCUMENTS

| | | | | |
|---|---|---|---|---|
| 6,308,173 | B1 * | 10/2001 | Glasser et al. | 1/1 |
| 2005/0091655 | A1 * | 4/2005 | Probert et al. | 718/100 |
| 2007/0101433 | A1 * | 5/2007 | Louch et al. | 726/25 |
| 2007/0294530 | A1 * | 12/2007 | Zlotnick | 713/167 |

* cited by examiner

*Primary Examiner* — Nathan Flynn
*Assistant Examiner* — Bryan Wright
(74) *Attorney, Agent, or Firm* — Advantedge Law Group

(57) ABSTRACT

A computer-implemented method may provide resource-access information. The computer-implemented method may include determining a resource-access scope of a software application and determining whether a resource is within the resource-access scope. The computer-implemented method may also include retrieving resource information associated with the resource from a resource-information database and providing a notification that indicates whether the resource is within the resource-access scope. The notification may comprise the resource information. Additional computer-implemented methods and systems are also disclosed.

19 Claims, 7 Drawing Sheets

METHODS AND SYSTEMS FOR PROVIDING RESOURCE-ACCESS INFORMATION

BACKGROUND

Over the next decade, computer security programs may continue to transition from primarily blacklist-based anti-malware solutions to whitelist-based solutions. Whitelist-based solutions may allow whitelisted software applications to run while blocking all other applications. However, whitelist-based solutions may not block all malicious code from executing. For example, a publisher may provide legitimate software for a period of time in order to gain trust and have the software whitelisted. The publisher may then introduce malicious code into the whitelisted software. As another example, a malicious developer in a trusted software company may introduce malware in a whitelisted program.

Traditional behavior-monitoring systems may provide some protection against malware in whitelisted software. Behavior-monitoring systems may monitor a software application and may ask a user about whether to allow the software application to access a potentially sensitive file. However, most traditional behavior-monitoring systems do not provide users with enough context to allow the users to make an informed decision. The information that traditional behavior-monitoring systems provide may be cryptic and unintelligible to a typical user. For example, JAVA, .NET, and other managed applications may provide users with a directory path for the potentially sensitive file, but the directory path may not help the user make a decision about whether to allow the software application to access the directory.

SUMMARY

The instant disclosure presents methods and systems for providing users with intelligible resource-access information that may help the users make informed decisions about whether to allow applications to access resources. For example, an application monitor may determine a resource-access scope of a software application, determine whether a resource is within the resource-access scope, and retrieve resource information associated with the resource from a resource-information database. The application monitor may then provide a user with a notification that includes the resource information and indicates whether the resource is within the resource-access scope. The resource information may provide information that helps a user determine whether to allow the software application to execute or access the resource.

In some embodiments, the application monitor may determine the resource-access scope of the software application after the software application is installed on a destination computer and before the software application is allowed to execute. In such embodiments, the resource-access scope may be access scope declared by a software application (e.g., file permissions declared by an assembly of the software application or access information in an application manifest of the software application). The application monitor may determine that the resource-access scope may be too broad. For example, the application monitor may determine that a potentially sensitive resource is within the resource-access scope. After determining that the resource is within the resource-access scope, the application monitor may notify the user that the software application is attempting to access the resource. The application monitor may also query the user about whether to allow the software application to execute. After receiving a response from the user, the application monitor may permit the software application to execute or prohibit the software application from executing based on the response from the user.

In other embodiments, the application monitor may monitor the behavior of the software application while it executes. For example, determining whether the resource is within the resource-access scope may comprise detecting that the software application is attempting to access a resource. The application-monitor module may determine that the resource is outside the resource-access scope of the software application. Then, the application-monitor module may query a user about whether to allow the software application to access the resource. The application monitor may deny or allow access to the resource based on the response from the user.

In some embodiments, determining the resource-access scope of the software application may comprise analyzing an assembly of the software application, analyzing meta-data of the software application, and/or selecting default resource-access rules. Analyzing an assembly of the software application may comprise determining file permissions declared by the assembly. In other embodiments, meta-data of the software application may comprise an application manifest of the software application. The application manifest may provide information about the resource-access scope of the software application.

The application monitor may create an access rule for the resource based on the response from the user. The access rule may indicate whether the software application is allowed to access the first resource. Thus, when the application attempts to access the resource a second time, the application-monitor module may apply the access rule rather then querying the user again.

The access rule may also be applied to other resources related to the resource (i.e., the first resource). The access rule may define access rights for all resources that share a particular attribute. For example, the application-monitor module may detect that the software application is attempting to access a second resource that has the same file extension as the first resource. The application-monitor module may apply the access rule to the attempt to access the second resource.

In at least one embodiment, detecting that the software application is attempting to access a resource may comprise determining that the software application is attempting to access a directory. Retrieving resource information associated with the resource may comprise determining a file type of a file contained in the directory. The application-monitor module may determine that the file type of the file is outside the resource-access scope of the software application and may alert a user about the attempted access.

Embodiments of the instant disclosure may provide various advantages over prior behavior monitoring systems. For example, by retrieving resource information associated with a resource from a resource-information database and providing a notification to a user that includes the resource information, an application-monitor module may provide a user with enough information to allow the user to make a decision about whether to allow a software application to access the resource. Embodiments of the instant disclosure may also result in more detailed application manifests, narrower access scoping of applications, and may help stop malicious publishers from accessing sensitive information. Embodiments of the instant disclosure may also provide various other features and advantages.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
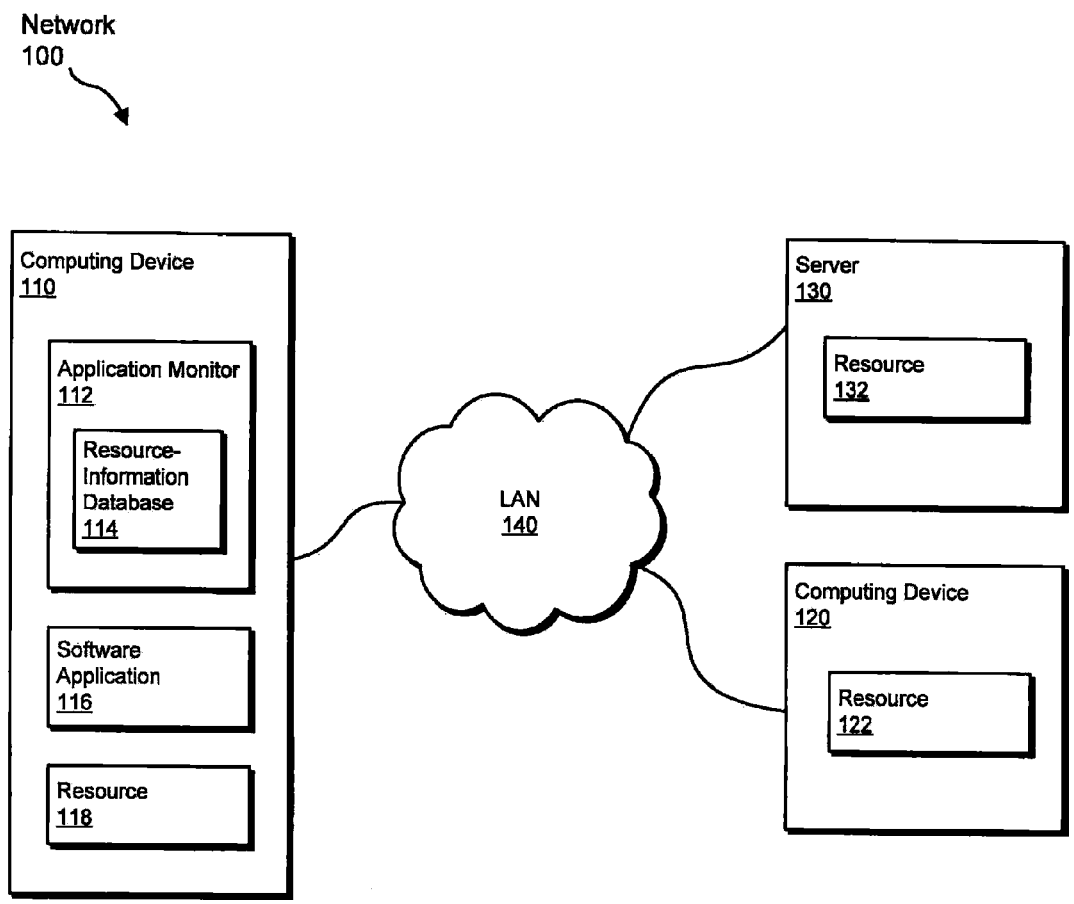
FIG. 1 is a block diagram of an exemplary network according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various exemplary embodiments and should not be taken to be limiting in any way. Various exemplary methods and systems for providing resource-access information are described and/or illustrated herein. For example, in some embodiments an application-monitor module may provide a user with resource-access information before a software application executes for the first time, and the application-monitor module may query the user about whether to allow the software application to run.

In other embodiments, an application-monitor module may detect that a software application is attempting to access a resource that is outside the resource-access scope of the software application. In such embodiments, the application-monitor module may provide a user with information about the attempt to access the resource and with information about the resource-access scope of the software application. The application monitor may query the user about whether to allow the software application to access the resource. Embodiments of the instant disclosure may provide various other features and advantages.

FIG. 1 illustrates a network 100. A computing device 110, a computing device 120, and a server 130 may communicate through a local area network (LAN) 140. Computing device 110 may be a desktop computer, a laptop computer, a handheld computer, a network computing device, or any other suitable computing device. Computing device 110 may include an application monitor 112, a software application 116, and a resource 118. Application monitor 112 may include a resource-information database 114. Server 130 may include a resource 132, and computing device 120 may include a resource 122.

Figure 3:
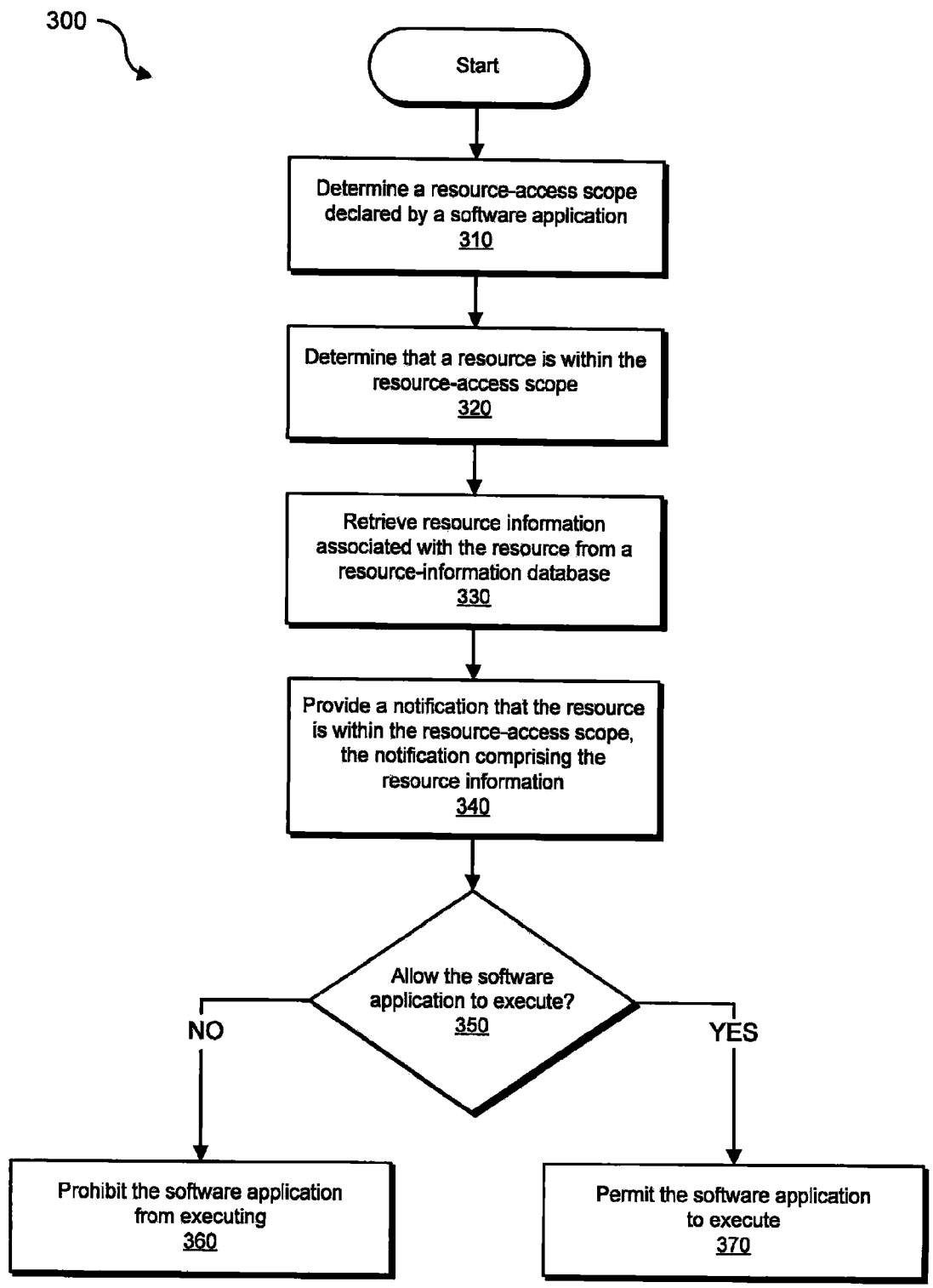
FIG. 3 is a flow diagram of an exemplary method for providing resource-access information according to certain embodiments.

Application monitor 112 may be a module, an application, or any other computer-executable code capable of providing resource-access information. For example, application monitor 112 may determine that software application 116 is attempting to execute for the first time. Application monitor 112 may then determine the resource-access scope defined or requested by software application 116. If the resource-access scope covers access to a potentially sensitive resource, application monitor 112 may retrieve information associated with the resource from resource-information database 114. Application monitor 112 may provide this information to a user of computing device 110. The resource information may help the user determine whether or not to allow software application 116 to execute. FIG. 3 and the corresponding description provide additional details about determining whether or not to allow a software application to execute.

In other embodiments, application monitor 112 may monitor software application 116 as it runs. Application monitor 112 may detect that software application 116 is attempting to access a resource that is outside the resource-access scope of software application 116. Application monitor 112 may retrieve resource information associated with the resource from resource-information database 114. Application monitor 112 may then provide a notification to a user of computing device 112 that the software application is attempting to access the resource. The notification may comprise the resource information, which may be detailed information about the resource that can help the user determine whether to allow application 116 to access the resource.

In some embodiments, application monitor 112 may query the user about whether to allow software application 116 to access the resource. For example, software application 116 may request access to resource 132 of server 130. Resource 132 may be a financial document that is outside the resource-access scope of software application 116. The user may decide to prohibit software application 116 from accessing resource 132. After receiving an indication of the user's decision to prohibit access to resource 132, application monitor 112 may automatically create an access rule that indicates software application 116 is not allowed to access resource 132. In other embodiments, application monitor 112 may query the user about whether the user wants to create an access rule before creating the access rule.

The access rule may prohibit a specific software application, such as software application 116, from accessing a specific resource, such as resource 132. The access rule may also prohibit software application 116 from accessing a type of resource. For example, if resource 132 is a financial document, application monitor 112 may query the user about whether to prohibit software application 116 from accessing all financial documents. If the user decides to prohibit software application 116 from accessing all financial documents, application monitor 112 may create an access rule that prohibits software application 116 from accessing all financial documents. Thus, if resource 122 of computing device 120 is a financial document, and software application 116 attempts to access resource 122, application monitor 112 may automatically prevent software application 116 from accessing resource 122.

In various embodiments, access rules may define permissions that allow or prohibit access to one or more resources or types of resources. An access rule may permit or prohibit reading, writing, copying, or performing any other access action on a resource. Access rules may be based on specific resources or associated with attributes of a resource. For example, an access rule may define access permissions for all resources with a particular file extension, name, or any other attribute.

In one example, application 116 may be a video editing application and may request access to "c:/users/john/documents*.*". Instead of sending a user an alert that states "VideoEditingApplication.exe is requesting access to c:/users/john/documents*.*", application monitor 140 may access resource-information database 114 to find additional information about the path c:/users/john/documents*.*. After identifying additional information, application monitor 112 may provide a notification that states "The Video Editing application wants access to c:/users/john/documents. This location contains your financial documents, your personal photos, and your music." Thus, application monitor 112 may help a user better understand the context of an access attempt by providing clear information about the resource that the software application is attempting to access.

Figure 2:
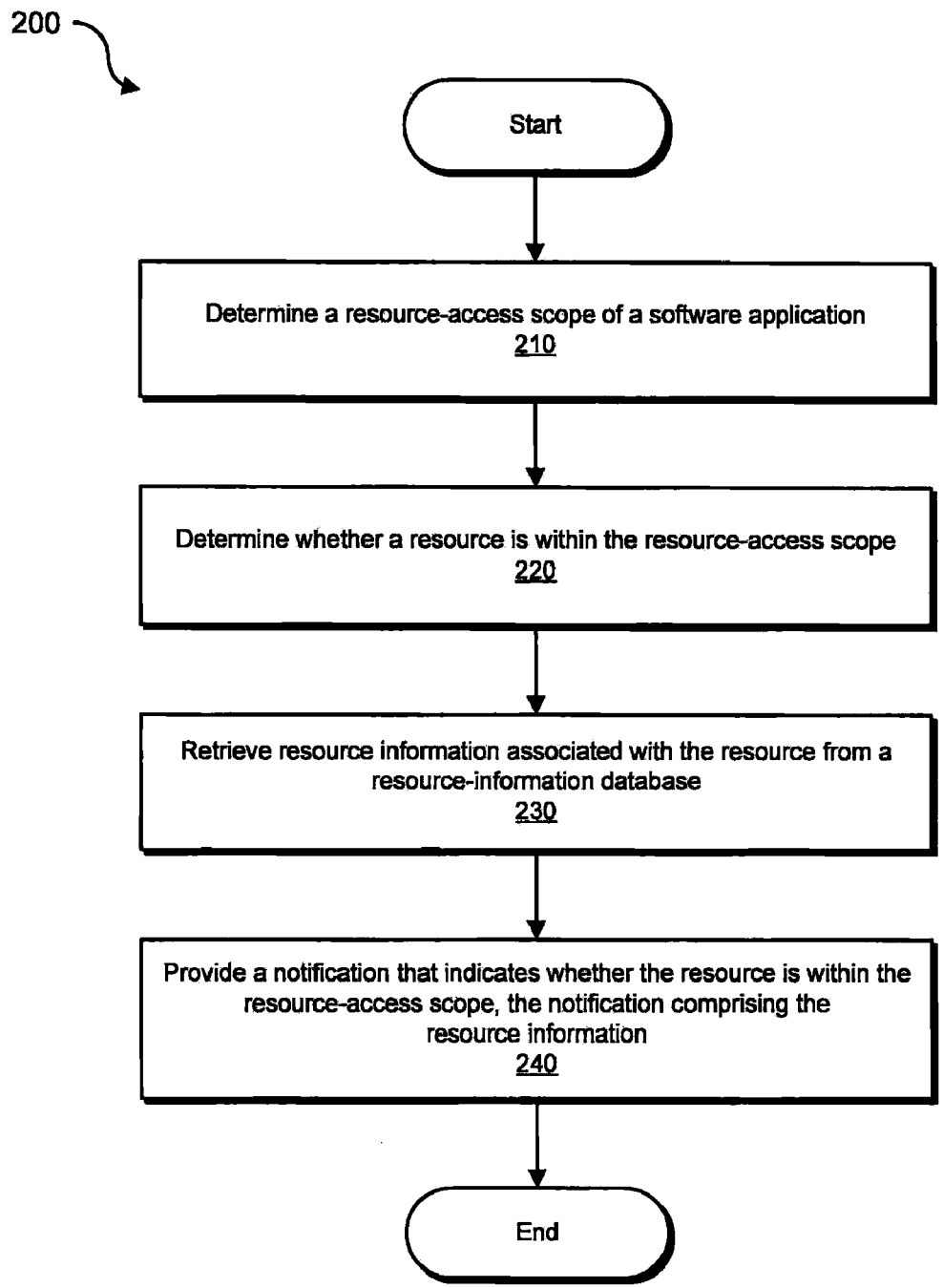
FIG. 2 is a flow diagram of an exemplary method for providing resource-access information according to certain embodiments.

FIG. 2 is a block diagram of a general computer-implemented method 200 for providing resource-access information. The computer-implemented method in FIG. 2 may be performed by an application monitor, such as application monitor 112. Computer-implemented method 200 may provide resource-access information about a software application before the software application executes for the first time, provide resource-access information when a software application attempts to access a resource, and/or provide resource-access information at various other times.

The application monitor may determine a resource-access scope of a software application (step 210). The application monitor may determine the resource-access scope of the software application after the software application is installed on a destination computer and before the software application is allowed to execute. In other embodiments, the application monitor may determine the resource-access scope of the software application when the software application attempts to access a resource. Determining the resource-access scope of the software application may also be performed at any other suitable time.

In some embodiments, determining the resource-access scope declared by the software application may comprise determining file permissions declared by an assembly (e.g., a MICROSOFT .NET assembly) of the software application. For example, the application monitor may analyze the software application's assembly to determine which file permissions the software application's assembly statically declares. In addition to or instead of looking at the application's assembly, the application monitor may analyze an application manifest of the software application. The application manifest may provide information about the resource-access scope of the software application. The application monitor may also use various other types of meta-data or other information to determine the resource-access scope of the software application.

The resource-access scope may be any variable, definition, declaration, or other information that indicates the scope of access requested, required, and/or utilized by a software application. For example, an application may request access to certain file systems or directories, and this access may be the resource-access scope of the application. An application's manifest, which may contain information about the application's access needs, may define that the application will only access certain file types, particular directories, or other information or resources. The resource-access scope may also define whether the software application accesses network resources, the internet, operating system resources (e.g., an application programming interface), peripheral devices (e.g., input and/or output devices) or any other resources that may be available to the software application. The resource may be any type of resource available to a software application. For example, the resource may be user data, a file system, a file, a folder, an application programming interface, a network resource, a communication port, a peripheral device, and/or any other type of computing resource.

After determining the resource-access scope of the software application, the application monitor may determine whether a resource is within the resource-access scope (step 220). In some embodiments, determining that the resource is within the resource-access scope may cause the application monitor to provide the user with information, such as a warning or a query. In one example, if the resource-access scope of the software application is broad and encompasses the resource, the application monitor may query the user about whether to allow the software application to execute.

In other embodiments, determining whether a resource is within the resource-access scope may comprise determining that the resource is not within the resource-access scope. For example, if the software application is already running and attempts to access a resource, the application monitor may detect that the resource is outside the scope of the software application's defined access. In response, the application monitor may provide a warning, a query, or any other type of notification to the user of the computer about the software application's attempt to access the resource.

Figure 5:
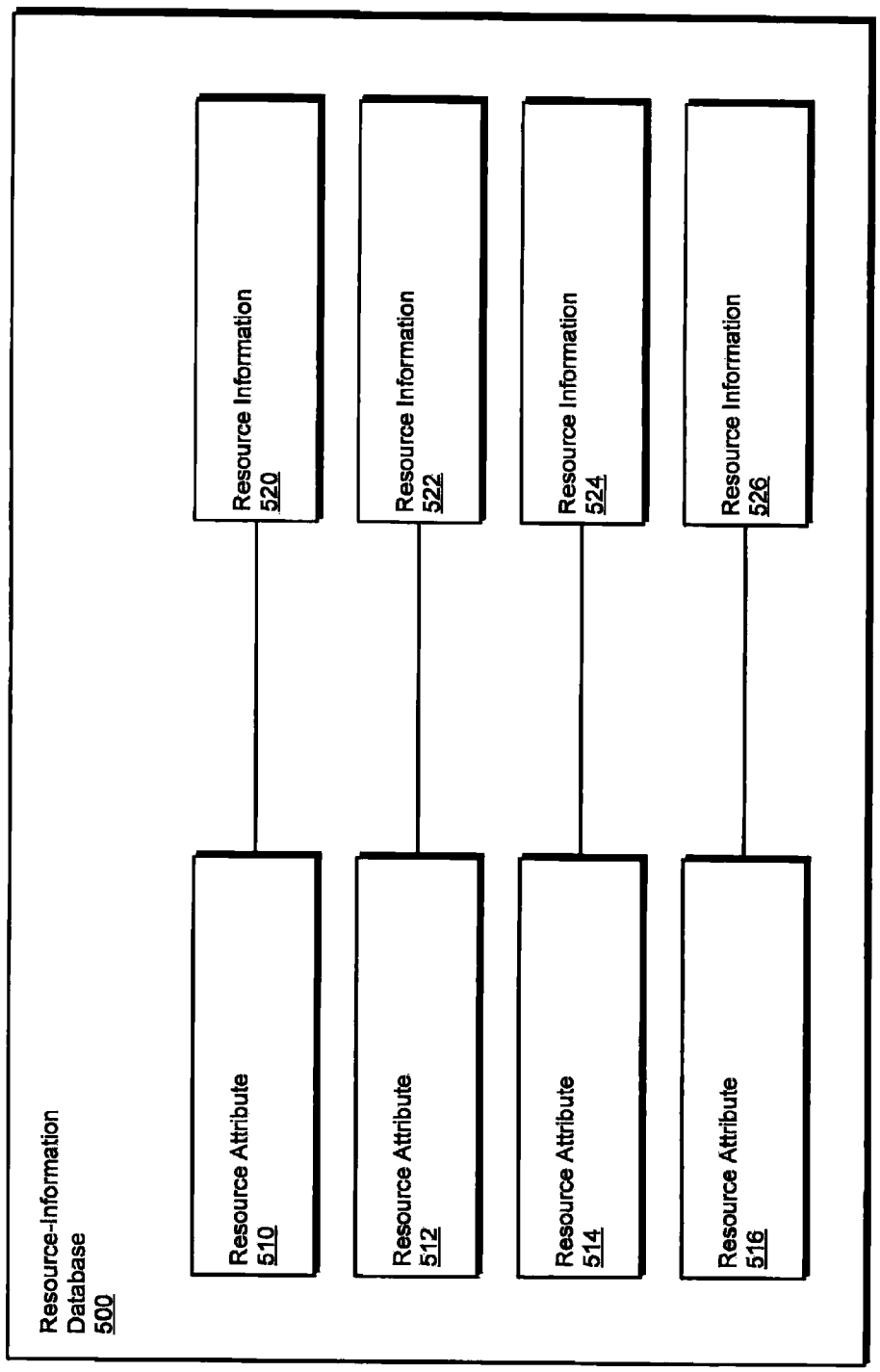
FIG. 5 is a block diagram of an exemplary resource-information database according to certain embodiments.

After determining whether the resource is within the resource-access scope, the application monitor may retrieve resource information associated with the resource from a resource-information database (step 230). FIG. 5 provides an example of a resource-information database. The resource-information database may associate the resource information with the resource by determining what type of resource the resource is. For example, if the resource is a QUICKEN financial file, the application monitor may search the resource-information database for resource-access information about QUICKEN financial files.

The application monitor may then provide a notification that indicates whether the resource is within the resource-access scope (step 240). A notification may include a warning that the software application is attempting to access the resource and may provide detailed information (e.g., from the resource information database) about the resource. A notification may also query the user about whether to allow access to the resource or whether to allow the software application to execute.

FIG. 3 is a flow diagram of a method for providing resource access information and determining whether to allow a software application to execute. An application monitor may determine a resource-access scope declared by the software application (step 310). The application monitor may then determine that the resource is within the resource-access scope (step 320) and may retrieve resource information associated with the resource from a resource-information database (step 330). The application monitor may provide a notification that the resource is within the resource-access scope (step 340). The notification may comprise the resource information.

The application monitor may ask the user of a computing device, at a time the software application is installed, whether to allow the software application to execute (decision point 350). The application monitor may prohibit the software application from executing if the response from the user indicates that the software application is not allowed to execute (step 360). Alternatively, the application monitor may permit the software application to execute if the response from the user indicates that the software application is allowed to execute (step 370).

Instead of or in addition to asking the user whether to allow the software application to execute, the application monitor may use the resource information and access-scope information to provide a security score or analysis of the software application. An application that requests narrower access to resources may evaluate as being less risky (e.g., may score better), while an application that requests broader access to potentially sensitive resources may evaluate as being more risky (e.g., may score worse). A potentially sensitive resource may be a folder, a file, or any other resource that may contain financial information (e.g., bank account information, credit card information, etc.), personal information (e.g., social security numbers, birthdays, passwords), or any other information that a user may want to keep others from accessing.

The process illustrated in FIG. 3 may be performed at various times. For example, a user may install the software application, and the process illustrated in FIG. 3 may be performed in response to the installation of the software application. In other embodiments, the method illustrated in FIG. 3 may be performed at the time a user first attempts to execute the software application. The method illustrated in FIG. 3 may also be performed at any other suitable time.

As an example of the process illustrated in FIG. 3, when a software application is first installed on a computing device, an application monitor may analyze the software application and determine the type of file access declared or required by the software application. As previously noted, the analysis may take into account publisher provided meta-data, such as application manifest data, that provides access scoping. The application monitor may translate these declarations into user-friendly messages that contain details about the implications of the access scope. For example, the access scope may include a critical operating system resource, and the application monitor may provide details about the risks associated with allowing the software application to execute and access the operating system resource.

The information about the risks associated with allowing the software application to execute may help a user make more informed decisions about whether to trust the application. In another example, a post-installation analysis of a media center application may reveal that the software application declares that it only touches files in the user's documents folder. The application monitor may access a database to find information about the documents folder and may provide an alert to the user that states: "Recently installed mediacenter.exe wants to access your documents folder. This folder contains your financial documents, your videos, and a sub-folder titled 'work documents.' If you do not trust this application you should not allow it to run."

The application monitor may create an alert by populating an alert template with specific information about a resource from an access-scope database. In the previous example, the alert template may include the following text: "Recently installed _____ wants to access _____. This folder contains _____. If you do not trust this application, you should not allow it to run." The application monitor may populate the template with specific information about a specific application, and as shown in the previous example, may result in an alert that states "Recently installed mediacenter.exe wants to access your documents folder. This folder contains your financial documents, your videos, and a sub-folder titled 'work documents.' If you do not trust this application you should not allow it to run." In other embodiments, an access-scope database may contain the full text of an alert. In such embodiments, the application monitor may display the information from the access-scope database without using a template.

Using an application monitor to provide access-scope information to users may prompt application publishers to provide more narrow and accurate scoping. For example, a publisher may not want end users to see numerous warnings about the access scope of an application, and the publisher may limit access scope to help the application appear less risky to end users. Examples of helping publishers and developers create accurate application manifests are provided in U.S. application Ser. No. 12/059,513, filed Mar. 31, 2008, and titled "Methods and Systems for Providing Application Manifest Information," the disclosure of which is incorporated, in its entirety, by this reference.

Figure 4:
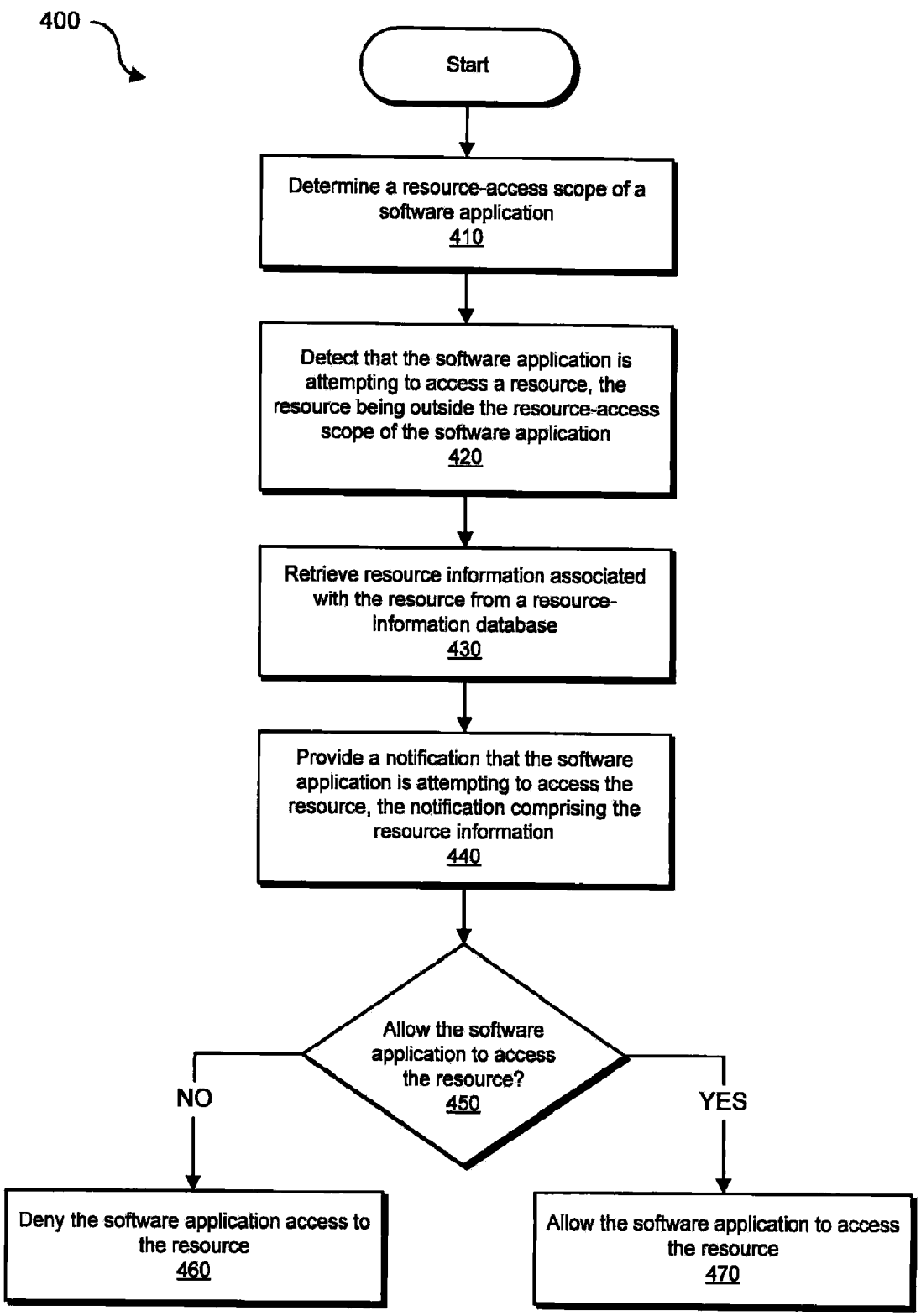
FIG. 4 is a flow diagram of an exemplary method for providing resource-access information according to certain embodiments.

FIG. 4 illustrates a computer-implemented method 400. As with FIG. 3, the steps illustrated in FIG. 4 may be performed by an application monitor. The application monitor may determine a resource-access scope of a software application (step 410). The application monitor may then detect that the software application is attempting to access a resource that is outside the resource-access scope of the software application (step 420). The application monitor may retrieve resource information associated with the resource from a resource-information database (step 430) and provide a notification that a software application is attempting to access the resource (step 440). The notification may comprise the resource information.

The application monitor may query a user about whether to allow the software application to access the resource (decision point 450). The application monitor may deny the software application access to the resource if the response from the user indicates that access to the resource is denied (step 460). On the other hand, the application monitor may allow the software application to access the resource if the response from the user indicates that the access to the resource is allowed (step 470).

As an example of the process illustrated in FIG. 4, the application monitor may detect that the software application is attempting to access a directory. The application monitor may determine a file type of each file contained in the directory and may discover that one or more of the files in the directory are outside the resource-access scope of the software application. The application monitor may lookup information about the files that are outside the resource scope and may report this information to a user. The information about the files may help the user determine whether to allow the software application to access the directory.

As another example, when an application makes a request to access a file within a .NET environment (in a properly designed .NET application, the application requests access to files and paths before actually opening them), an application monitor may detect the request and identify information about the file. If the application exceeds its declared scope, the application monitor may block access to the file or may provide a user with an alert about the requested access. In other embodiments, an application may not declare its access scope or provide any other access-scope information. In such situations, the application monitor may apply generic access rules or default access rules.

FIG. 5 illustrates an example of a resource-information database 500. Resource-information database 500 may include resource attributes 510, 512, 514, and 516. Resource-information database 500 may also include resource information 520, 522, 524, and 526. As shown, resource attribute 510 may be associated with resource information 520, resource attribute 512 may be associated with resource information 522, resource attribute 514 may be associated with resource information 524, and resource attribute 516 may be associated with resource information 526.

Resource-information database 500 may be any suitable database or other storage system for associating resources with resource information. A resource-information database may be part of an application monitor or separate from the application monitor. Resource attributes 510, 512, 514, and 516 may be any attribute of a resource, such as a file name, a file type, a directory name, a setting of a file or folder, or any other attribute of any type of resource. Resource information 520, 522, 524, and 526 may be any information about a resource. For example, resource information 520 may be information about the "My Documents" directory such as "The My Documents folder may contain sensitive personal or financial information."

As previously noted, embodiments of the present disclosure may provide many advantages. Application monitors may provide users with information that may help the users determine whether to allow an application to execute or access a resource. Publishers may make an effort to provide more detailed application manifests and narrower scoping so that their applications receive better initial evaluations and provide less warnings to end users (applications that do not include application manifests or that request broad resource access may seem less secure). Embodiments of the instant disclosure may also limit a malicious publisher's ability to access sensitive resources because, in order to access a sensitive resource, the publisher may either request broad access up front or not request broad access and try to access the sensitive resource anyway. Either approach may result in a poor security evaluation of the application and more user interaction, which may make the application seem less secure.

Figure 6:
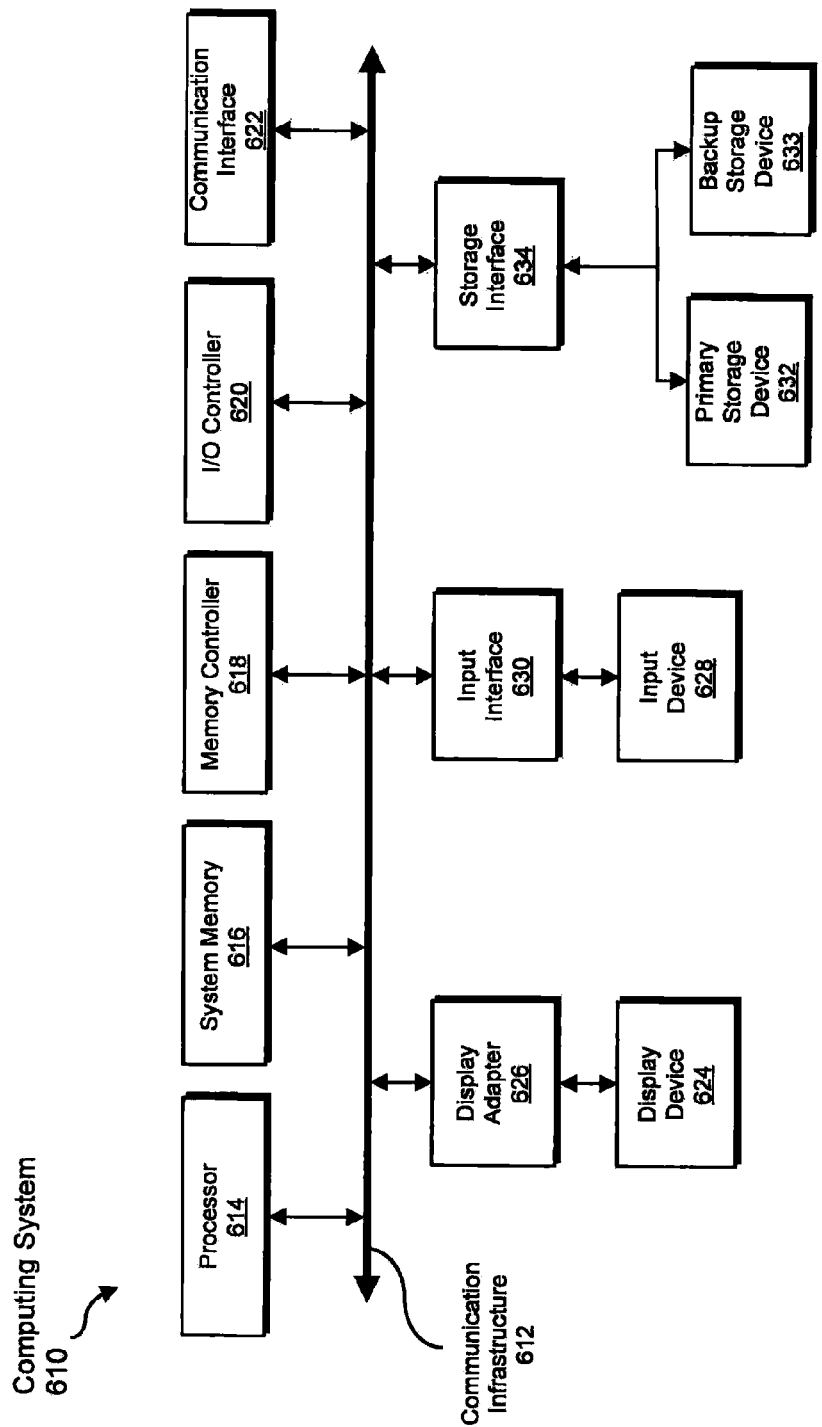
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the determining, retrieving, providing, querying, receiving, prohibiting, permitting, allowing, installing, detecting, analyzing, denying, and/or creating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as determining, retrieving, providing, querying, receiving, prohibiting, permitting, allowing, installing, detecting, analyzing, denying, and/or creating.

I/O controller 620 generally represents any type or form of module capable of coordinating and/or controlling the input and output functions of a computing device. For example, in certain embodiments I/O controller may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the determining, retrieving, providing, querying, receiving, prohibiting, permitting, allowing, installing, detecting, analyzing, denying, and/or creating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the determining, retrieving, providing, querying, receiving, prohibiting, permitting, allowing, installing, detecting, analyzing, denying, and/or creating steps described herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the determining, retrieving, providing, querying, receiving, prohibiting, permitting, allowing, installing, detecting, analyzing, denying, and/or creating steps described herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the determining, retrieving, providing, querying, receiving, prohibiting, permitting, allowing, installing, detecting, analyzing, denying, and/or creating steps described herein. Storage devices 632 and 633 may also be used to perform and/or be a means for performing other steps and features set forth in the instant disclosure.

Many other devices or subsystems may be connected to computing system 710. Conversely, all of the components and devices illustrated in FIG. 6 need not be present to practice the embodiments descried and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a software application (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the software application may be loaded into computing system 610. All or a portion of the software application stored on the computer-readable medium may then be stored in system memory 616 and/or various portions of storage devices 632 and 633. When executed by processor 614, a software application loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
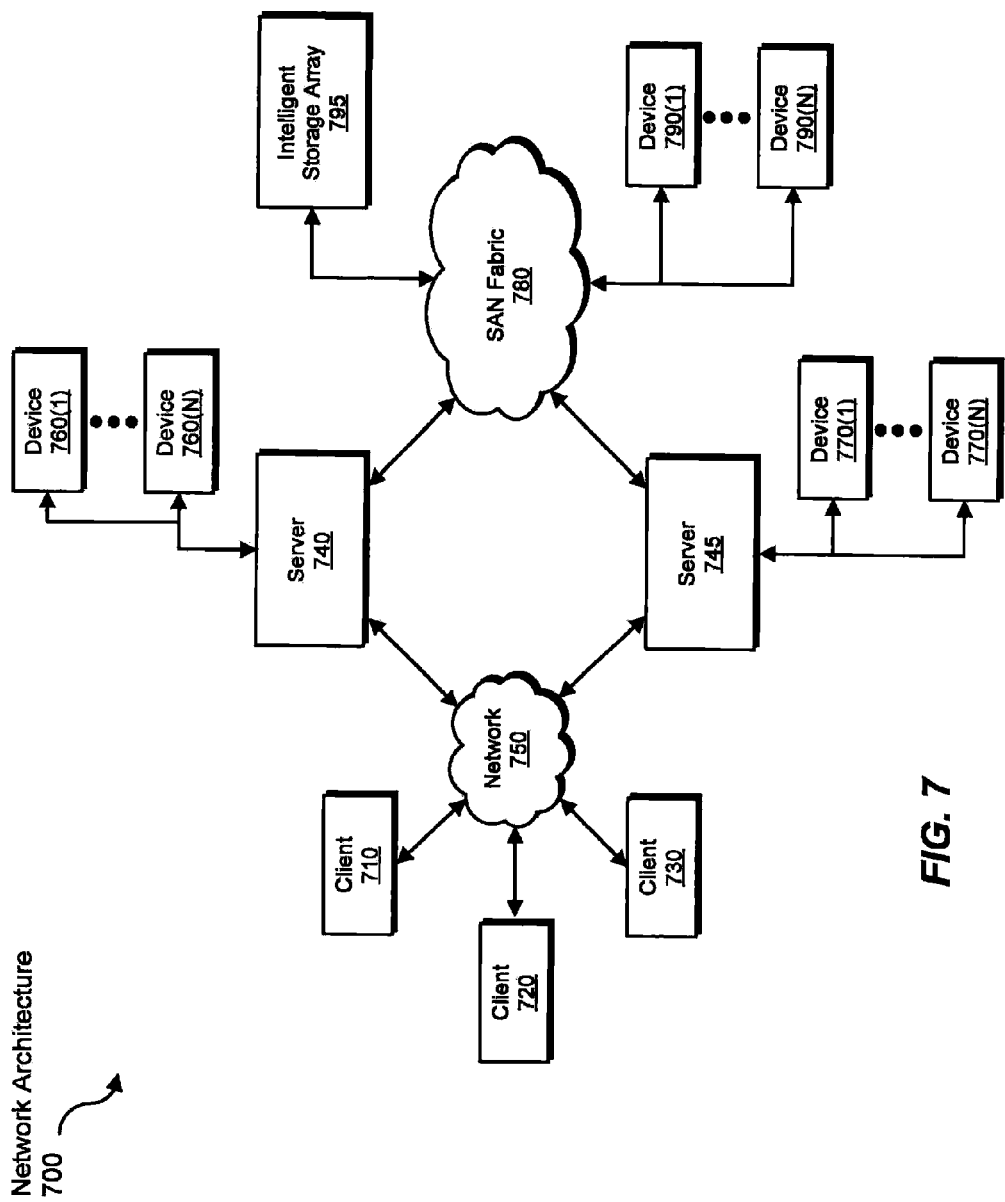
FIG. 7 is a block diagram of an exemplary computing system capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (FAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a software application and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a software application, stored in server 740, run by server 745, and distributed to client systems 710, 720, and 730 over network 750. Accordingly, network architecture 700 may perform and/or be a means for performing, either alone or in combination with other elements, one or more of the determining, retrieving, providing, querying, receiving, prohibiting, permitting, allowing, installing, detecting, analyzing, denying, and/or creating steps described herein. Network architecture As detailed above, computing system 610 and/or one or more of components of network architecture 700 may perform and/or be means for performing, either alone or in combination with other elements, one or more steps of the exemplary computer-implemented methods described and/or illustrated herein. According to certain embodiments, a computer-implemented method may comprise determining a resource-access scope of a software application, determining whether a resource is within the resource-access scope, retrieving resource information associated with the resource from a resource-information database, and providing a notification that indicates whether the resource is within the resource-access scope. The notification may comprise the resource information.

The computer-implemented method, in some embodiments, may comprise determining that the resource-access scope of the software application is performed after the software application is installed on a destination computer and before the software application is allowed to execute. The resource-access scope may be declared by the software application, and determining whether the resource is within the resource-access scope may comprise determining the resource is within the resource-access scope.

Some embodiments may comprise querying a user about whether to allow the software application to execute. Providing a notification may comprise querying the user about whether to allow the software application to execute. The method may also comprise receiving a response from a user and prohibiting the software application form executing if the response indicates that the software application is not allowed to execute. If the response indicates that the software application is allowed to execute, the method may comprise permitting the software application to execute.

In some embodiments, determining whether the resource is within the resource-access scope may comprise detecting that the software application is attempting to access a resource. The resource may be outside the resource-access scope of the software application.

In some embodiments, the method may comprise querying a user about whether to allow the software application to access the resource. Providing the notification may comprise querying the user about whether to allow the software application to access the resource. The method may comprise receiving a response from a user and denying the software application access to the resource if the response indicates that the access to the resource is denied. If the response indicates that the access to the resource is allowed, the method may comprise allowing the software application to access the resource. In some embodiments, the resource may comprise at least one of a file system, a file, a folder, an application programming interface, a network resource, and/or a communication port.

In various embodiments, a computer-implemented method for providing resource-access information about an application may comprise determining a resource-access scope declared by a software application. The computer-implemented method may also comprise determining that a resource is within the resource-access scope and retrieving information associated with the resource from a resource-information database. The method may comprise providing a notification that the resource is within the resource-access scope. The notification may comprise the resource information.

In some embodiments, the method may comprise querying a user about whether to allow the software application to execute, receiving a response from the user, and prohibiting or permitting the software application to execute based on the response from the user. In various embodiments, determining the resource-access scope declared by the software application may comprise determining file permissions declared by an assembly of the software application. In other embodiments, determining the resource-access scope declared by the software application may comprise analyzing the application manifest of the software application. The application manifest may provide information about the resource-access scope of the software application. In at least one embodiment, the method may further comprise installing the software application. Determining a resource-access scope declared by the software application may be performed in response to installing the software application.

According to certain embodiments, a computer-implemented method for providing information about resource access of an application may comprise determining a resource-access scope of a software application, detecting that the software application is attempting to access a resource, retrieving resource information associated with a resource from a resource-information database, and providing a notification that a software application is attempting to access the resource. The resource may be outside the resource-access scope of the software application and the notification may comprise the resource information.

In some embodiments, determining the resource-access scope of the software application may comprise at least one of analyzing an assembly of the software application, analyzing meta-data of the software application, and/or selecting default resource-access rules. In some embodiments, analyzing an assembly of the software application may comprise determining file permissions declared by the assembly. According to at least one embodiment, the meta-data may comprise an application manifest of the software application. The application manifest may provide information about the resource-access scope of the software application.

In some embodiments, the notification may comprise an indication that the resource is outside the resource-access scope of the software application. The computer-implemented method may also comprise querying the user about whether to allow the software application to access the resource, receiving a response from the user, and denying or allowing access to the resource based on the response from the user.

In some embodiments, the method may comprise creating an access rule for the resource based on the response from the user. The access rule may indicate whether the software application is allowed to access the first resource. The method may further comprise detecting that the software application is attempting to access a second resource, determining that the access rule applies to the second resource, and applying the access rule to the second resource. The access rule may indicate whether the software application is allowed to access resources having a first attribute, and the first and second resources may have the first attribute.

In some embodiments, detecting that the software application is attempting to access a resource may comprise determining a directory that the software application is attempting to access. Retrieving resource information associated with the resource from a resource-information database may comprise determining a file type of a file contained in the directory and determining that the file type of the file is outside of the resource-access scope of the software application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for providing resource-access information by an application monitor, at least a portion of the method being performed by a computing device comprising at least one processor, the computer-implemented method comprising:

prior to executing a software application for a first time, determining a resource-access scope of the software application that defines which resources are accessible to the software application upon execution of the software application;

determining that a particular resource is within the resource-access scope of the software application, wherein the particular resource comprises a directory that stores sensitive information;

retrieving, from a resource-information database, resource information that identifies a risk of the particular resource potentially containing sensitive information, wherein:

retrieving the resource information comprises accessing the resource-information database for information about the folder and finding that the resource information indicates that the directory stores the sensitive information;
providing a user-readable notification based on the resource-access scope and the resource information that:
indicates that the particular resource is accessible to the software application upon execution of the software application;
identifies the risk associated with allowing the software application to access the particular resource that potentially contains sensitive information;
queries a user about whether to allow the software application to execute,
wherein the resource-access scope of the software application is determined based on at least one of an assembly and a manifest of the software application.

2. The computer-implemented method of claim 1, wherein querying the user about whether to allow the software application to execute comprises:
determining a resource type of the particular resource;
querying the user about whether to allow the software application to access resources of the resource type of the particular resource;
receiving a response from the user indicating that the software application is not allowed to access the resources of the resource type of the particular resource;
creating an access rule that prohibits the software application from accessing resources of the resource type of the particular resource.

3. The computer-implemented method of claim 1, wherein determining the software application's resource-access scope comprises at least one of:
analyzing the assembly of the software application to determine which file permissions the assembly statically declares;
analyzing the manifest of the software application that defines that the software application will only access at least one of: certain file types and particular directories.

4. The computer-implemented method of claim 1, wherein querying the user about whether to allow the software application to execute comprises:
querying the user about whether to allow the software application to access the particular resource upon execution of the software application;
receiving a response from the user;
denying the software application access to the particular resource upon execution of the software application if the response indicates that access to the particular resource is denied;
allowing the software application to access the particular resource upon execution of the software application if the response indicates that access to the particular resource is allowed.

5. The computer-implemented method of claim 1, wherein:
determining the resource-access scope of the software application comprises identifying a declaration of the software application that defines the resource-access scope;
providing the user-readable notification comprises translating the declaration of the software application into a user-readable message that indicates one or more implications of the software application having the resource-access scope.

6. A system for providing resource-access information, the system comprising:
a resource-information database configured to store information associated with one or more resources;
an application monitor configured to:
determine, prior to executing a software application for a first time, a resource-access scope of the software application that defines which resources are accessible to the software application upon execution of the software application;
determine that a particular resource is within the resource-access scope of the software application, wherein the particular resource comprises a directory that stores sensitive information;
in response to determining that the particular resource is within the resource-access scope of the software application, retrieve, from the resource-information database, resource information that identifies a risk of the particular resource potentially containing sensitive information, wherein:
the application monitor is configured to retrieve the resource information by accessing the resource-information database for information about the folder and finding that the resource information indicates that the directory stores the sensitive information;
provide a user-readable notification based on the resource-access scope and the resource information that:
indicates that the particular resource is accessible to the software application upon execution of the software application;
identifies the risk associated with allowing the software application to access the particular resource that potentially contains sensitive information;
queries a user about whether to allow the software application to execute;
at least one processor configured to execute the application monitor,
wherein the resource-access scope of the software application is determined based on at least one of an assembly and a manifest of the software application.

7. The system of claim 6, wherein the application monitor is further configured to:
after querying the user, receive a response indicating whether to execute the software application from the user;
prohibit the software application from executing if the response indicates that the software application is not allowed to execute;
permit the software application to execute if the response indicates that the software application is allowed to execute.

8. The system of claim 6, wherein the application monitor is further configured to determine file permissions declared by the assembly of the software application.

9. The system of claim 6, wherein the application monitor is further configured to analyze the manifest of the software application that provides information about the resource-access scope of the software application.

10. The system of claim 6, wherein the application monitor is further configured to create the user-readable notification by populating an alert template with the resource information retrieved from the resource-information database.

11. A non-transitory computer-readable-storage medium comprising one or more computer-executable instructions for an application monitor that, when executed by at least one processor of a computing device, cause the computing device to:
determine, prior to executing a software application for a first time, a resource-access scope of the software application that defines which resources are accessible to the software application upon execution of the software application;

determine that a particular resource is within the resource-access scope of the software application, wherein the particular resource comprises a directory that stores sensitive information;

retrieve, from a resource-information database, resource information that identifies a risk of the particular resource potentially containing sensitive information, wherein the one or more computer-executable instructions are programmed to retrieve the resource information by accessing the resource-information database for information about the folder and finding that the resource information indicates that the directory stores the sensitive information;

provide a user-readable notification based on the resource-access scope and the resource information that:
  indicates that the particular resource is accessible to the software application upon execution of the software application;
  identifies the risk associated with allowing the software application to access the particular resource that potentially contains sensitive information;
  queries a user about whether to allow the software application to execute,
  wherein the resource-access scope of the software application is determined based on at least one of an assembly and a manifest of the software application.

12. The non-transitory computer-readable-storage medium of claim 11, wherein the one or more computer-executable instructions, when executed by the computing device, further cause the computing device to:
  analyze meta-data of the software application that comprises information about the software application's resource-access scope;
  select default resource-access rules that define the software-application's resource-access scope.

13. The non-transitory computer-readable-storage medium of claim 11, wherein the one or more computer-executable instructions, when executed by the computing device, further cause the computing device to analyze the assembly of the software application to determine file permissions declared by the assembly.

14. The non-transitory computer-readable-storage medium of claim 12, wherein:
  the meta-data comprises the manifest of the software application, the manifest providing information about the resource-access scope of the software application.

15. The non-transitory computer-readable-storage medium of claim 11, wherein:
  the user-readable notification comprises a security score that indicates a level of risk associated with allowing the software application to access the particular resource.

16. The non-transitory computer-readable-storage medium of claim 11, wherein the one or more computer-executable instructions, when executed by the computing device, further cause the computing device to:
  query the user about whether to allow the software application to access the particular resource upon execution of the software application,
  receive a response from the user;
  deny the software application access to the particular resource upon execution of the software application if the response indicates that access to the particular resource is denied;
  allow the software application to access the particular resource upon execution of the software application if the response indicates that access to the particular resource is allowed.

17. The non-transitory computer-readable-storage medium of claim 16, wherein the one or more computer-executable instructions, when executed by the computing device, further cause the computing device to:
  create an access rule for the particular resource based on the response from the user, wherein the access rule indicates whether the software application is allowed to access the particular resource upon execution of the software application.

18. The non-transitory computer-readable-storage medium of claim 11, wherein the one or more computer-executable instructions, when executed by the computing device, further cause the computing device to:
  analyze the assembly of the software application to determine which file permissions the assembly statically declares.

19. The non-transitory computer-readable-storage medium of claim 11, wherein the potential risk associated with allowing the software application to access the particular resource comprises at least one of:
  allowing access to a particular resource that contains financial information;
  allowing access to a particular resource that contains personal information.

* * * * *